March 9, 1965 TAKESHI KAWAHASHI ETAL 3,173,108

MULTI-FREQUENCY UHF OSCILLATOR

Filed May 16, 1962 2 Sheets-Sheet 1

Inventors
T. KAWAHASHI-
T. TOMIZAWA
By Arthur M. Lieberman
AGENT

Inventors
T. KAWAHASHI-
T. TOMIZAWA
By Arthur M Lieberman
AGENT

United States Patent Office 3,173,108
Patented Mar. 9, 1965

3,173,108

MULTI-FREQUENCY UHF OSCILLATOR

Takeshi Kawahashi and Tadashi Tomizawa, Minato-ku, Tokyo, Japan, assignors to Nippon Electric Company, Limited, Tokyo, Japan, a corporation of Japan Filed May 16, 1962, Ser. No. 195,135
Claims priority, application Japan, May 17, 1961, 36/17,720
8 Claims. (Cl. 332—29)

This invention relates to an ultra-high-frequency oscillator and an ultra-high-frequency oscillator-modulator, and more particularly to a multi-frequency oscillator for generating two or more oscillations of different frequencies.

In an amplifier, particularly in a travelling-wave tube amplifier for use in an ultra-high-frequency communication system, many attempts have been made to reduce as far as possible the number of the ultra-high-frequency or microwave tubes used, because of their cost and the cost of the accompanying highly stabilized direct-current power sources. One such attempt employs the use of a travelling-wave tube oscillator for the dual purpose of amplification and the oscillation-generation of microwaves; since it has been found that by virtue of the wide-band amplification characteristics of a travelling-wave tube amplifier it is easy to employ the greater portion of the band for amplification and the remainder for the generation of an oscillation.

Although such a dual purpose use is well known it has not been possible (for reasons to be later explained) to attain stable operation of an amplifier which serves as a two-frequency oscillator.

In line-of-sight microwave repeater stations the receiving an a transmitting equipment are generally arranged such that the received signal is demodulated at the receiving equipment and then the output of a microwave oscillator in the transmitting equipment is frequency- or phase-modulated with the demodulated signal, thereby effecting the so-called detection-repeating. Inasmuch as the receiving equipment is generally of a super-heterodyne type, a microwave local oscillator must be provided therein. However, it is not preferable because of the aforementioned reasons, to provide another microwave oscillator in order to generate the local oscillation. It would therefore be very desirable if the microwave amplifier already avaliable in the transmitting equipment could be used as the local oscillator. Inasmuch as frequency- or phase-modulation is effected in the oscillator for transmission use and consequently the output frequency thereof is always varying according to the modulation signal, it is very difficult to utilize some part of the transmitter output for the local oscillator in the conventional way, because the modulation signal must be superposed on the received signal output.

Hence one object of the invention is to provide a two- or multi-frequency oscillator of stabilized operation, which comprises only one microwave amplifier.

Another object of the invention is to provide an oscillator-modulator which comprises only one microwave amplifier, and yet which can generate stable multi-frequency oscillation and serve the frequency- or phase-modulation function.

The above mentioned and other features and objects of this invention and the manner of attaining them will become more apparent and the invention itself will best be understood by reference to the following description of an embodiment of the invention taken in conjunction with the accompanying drawings wherein.

Figure 1:
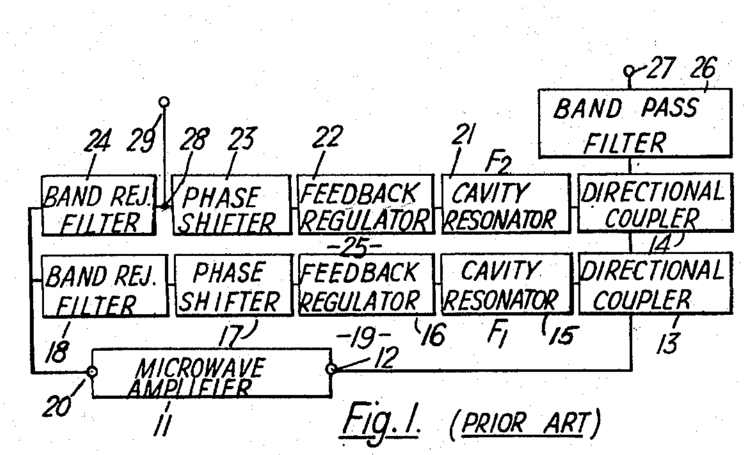
Fig. 1. (PRIOR ART)
FIG. 1 illustrates schematically the construction of a conventional two-frequency oscillator.
Figure 2:
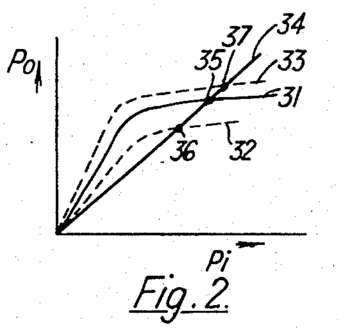
FIGS. 2 and 3 are input-output power characteristic curves of an amplifier and a feedback circuit for explaining the invention.

FIG. 1 is a block diagram showing the basic construction of a two-frequency oscillator, namely the simplest multi-frequency oscillator. The output of a microwave amplifier 11 (e.g. a traveling wave tube) is derived from output terminal 12 and fed back through the branching circuits 13 and 14 (e.g. directional couplers) to the input side thereof. A part of the output power of the directional coupler 13 is fed back through the cavity resonator 15 (which resonates at frequency $F_1$), the feedback regulator 16, the phase shifter 17, and the band-rejection filter 18 (which altogether form the feedback circuit 19) to the input terminal 20 of the amplifier 11. Another part of the output power is fed back to the input terminal 20 through another cavity resonator 21 (which resonates at frequency $F_2$) another feedback regulator 22, another phase shifter 23, and another band-rejection filter 24, (which altogether form another feedback circuit 25). With such a construtcion two frequencies are available; one via one of the arms of the directional coupler 14 and band-pass filter 26 at the output terminal 27, and the other at a second output terminal 29 which is connected to the junction point 28 of the second phase shifter 23 and the second band-rejection filter 24.

Where a travelling-wave tube amplifier is used as the amplifier 11 FIG. 2 shows the saturation of the output power (ordinate) with increased input power (abscissa). Curves 31, 32 and 33 show 3 values of gain in which curves 33 and 32 represent larger and smaller gains, respectively, than curve 31; obtained for example by altering the source voltages. As is described in copending application No. 119,696, filed June 26, 1961, now Patent No. 3,104,359, issued September 17, 1963, to the same assignee, a stable oscillation can be generated at any of the points of intersection (35, 36, 37) of the curves and a straight line 34 representing the input-output characteristics of the linear feedback circuit 19 or 25 of FIG. 1. It is to be noted that the input-output characteristics of the feedback circuit are plotted with the input as the ordinate and the output as the abscissa. Where the curves 31, 32, and 33 do not intersect the straight line 34, oscillation can not be sustained.

In the two-frequency oscillator of FIG. 1 the above-mentioned conditions for continued oscillation must hold with regard to each of the feedback circuits 19 and 25 at frequencies $F_1$ and $F_2$ respectively. On the other hand, the gain $G_{F2}$ of a travelling-wave tube amplifier for an oscillation of frequency $F_2$ is, as is well known, a function of the gain $G_{F1}$ of the same travelling-wave tube (for another oscillation frequency $F_1$) and the oscillation power $P_{F1}$, and accordingly can be expressed by:

$$G_{F2}=f(G_{F1}, P_{F1})$$

Figure 3:
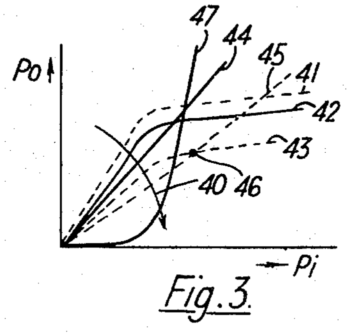

FIG. 3 shows the relation of the above-described equation with the gain $G_{F1}$ or the power $P_{FL}$ as a parameter; in which again the input power $Pi$ (abscissa) is plotted against the output power $Po$ (ordinate). An increase of the gain $G_{F1}$ or the power $P_{F1}$ in the sense shown by the arrow 40 results in a variation of the gain $G_{F2}$ in the manner shown by curves 41, 42 and 43. If the designed feedback characteristics for the oscillation frequency $F_2$ is shown by a straight line 44, a decrease of the gain $G_{F2}$ down to a level shown by the curve 43 (which the straight line 44 does not intersect) brings about a suspension of the oscillation at frequency $F_2$ and the loss of function as a two-frequency oscillator. A similar result occurs with the reverse variation in parameters and frequency $F_1$ is last. If such a two-frequency oscillator is used in a microwave communication apparatus of the above described kind, the suspension of one oscillation in the manner explained will be likely because the level of one of the oscillations is generally very high compared with the level of the other. If the feedback characteristic of the feedback circuit sustaining the lower level oscillation is changed from the characteristic shown by the straight line 44 to that shown by dashed line 45 it may be possible to obtain oscillations even if the gain $G_{F1}$ is larger, since a point 46 of intersection is obtainable. It will, however, be impossible to completely obviate the chance of suspension of one of the oscillations under some circumstances, because more feedback is effected with the feedback characteristic of line 45 than with that of line 44, and an increased oscillation level ratio may still occur. It will therefore be understood that the only way suspension of one frequency can be completely averted is if the feedback characteristics are modified so as to be represented by a curve 47 instead of the straight lines 44 or 45. Such non-linear feedback can be obtained with the circuit described in the aforementioned patent application and will not be further described here.

It will now be appreciated that a stable two-frequency oscillator is obtainable with a travelling wave tube oscillator and two feedback circuits, by making the feedback characteristics of one of the feedback circuits non-linear.

Figure 4:
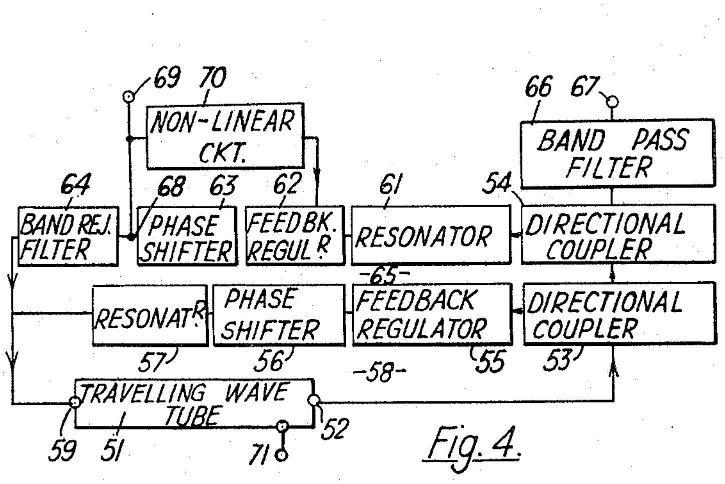
FIG. 4 is a block diagram of a multi-frequency oscillator according to the invention.

Turning now to FIG. 4, which is a block diagram of an embodiment of the invention, a microwave two-frequency oscillator is shown. As in the case of the basic two-frequency oscillator of FIG. 1 it comprises a microwave amplifier 51 the output terminal 52 of which is fed to two directional couplers 53 and 54. The coupler 53 provides a feedback path through feedback regulator 55, a phase shifter 56, and a cavity resonator 57 to input terminal 59 of the amplifier 51. The coupler 54 on the other hand, provides another feedback path through another cavity resonator 61, another feedback regulator 62, another phase shifter 63, and a band-rejection filter 64, to the input terminal 59. The output power of a first oscillation is derived at terminal 67 via the directional coupler 54 and a band-pass filter 66; whereas the second oscillation is taken out at a second output terminal 69 which is connected to the output of the second phase shifter 63 at a junction point 68. In order to provide the second feedback circuit 65 with non-linear characteristics, the signal obtained at the junction point 68 is fed to a non-linear circuit 70, whose output in turn is fed to the feedback regulator 62. The non-linear feedback circuit 65 comprises the non-linear circuit 70 which, as mentioned previously, is described in application No. 119,696, now Patent No. 3,104,359, issued September 17, 1963. The reason why the first feedback circuit 58 of the embodiment shown in FIG. 4 is composed in the manner described is to do without the band-rejection filter corresponding to the filter 18 in FIG. 1. With this construction, the resonator 57 serves also as a band-rejection filter and so rejects the signal having the frequency obtained in the second feedback circuit 65.

As is well-known, a travelling wave tube oscillator may be frequency-modulated by the signal to be transmitted, or the modulating signal, which is applied for example on its helical electrode. In this manner, the oscillator of FIG. 4 may be used as an oscillator-modulator by providing an input terminal 71 for the helical electrode (shown in FIG. 4 by a dotted line) and by supplying it with the signal to be transmitted.

In case the oscillator of FIG. 4 is used as an oscillator-modulator, it necessarily follows that output level of the oscillation which is to be frequency-modulated, (for example that obtained in the oscillation circuit comprising the first feedback circuit 58) must be considerably higher than the output level of the other oscillation which is less frequency-modulated, (and which is produced by the second oscillation circuit comprising the second feedback circuit 65). The higher the ratio in oscillation levels becomes the more the invention becomes indispensable, because under such circumstances the chance of suspension of the lower level oscillation is enhanced, as has been explained with reference to FIG. 3. In other words, the oscillator-modulator shown in FIG. 4 could have never been obtained prior to the invention.

It is to be noted that, when a modulating signal is applied to the input terminal 71 and the oscillation frequency of the first oscillation circuit comprising the first feedback circuit 58 is thereby frequency modulated, then the oscillation frequency of the other oscillation circuit comprising the second feedback circuit 65 is also inevitably frequency modulated. It is desirable therefore, in order that the second oscillation circuit comprising the second feedback circuit 65 may be used (as has been described in the preamble of the specification) as a local oscillator, to minimize as far as possible such undesired frequency modulation in the second oscillation circuit. At the same time, the Q of the first cavity resonator 57 must be low, since a wide frequency band is necessary in the first feedback circuit 58 in order to maintain the quality of the communication. If the Q's of the first and second cavity resonators 57 and 61 are $Q_1$ and $Q_2$, respectively, the modulation degree of the oscillation frequency of the second oscillation circuit (comprising the second feedback circuit 65) can be reduced when the ratio of $Q_2$ to $Q_1$, or $Q_2/Q_1$, is large. If $Q_1$ and $Q_2$ are for example 30 and 10,000, respectively, the frequency modulation of the oscillation frequency of the lower-level local oscillator portion (comprising the second feedback circuit 65) is lower by the order of 50 db than the frequency modulation of the oscillation frequency of the frequency-modulator portion comprising the first feedback circuit 58. In addition, it will be understood that sufficient frequency stability in the local oscillator portion in some cases also necessitates temperatures compensating means as well as moisture preventing means accompanying the second cavity resonator 61 to eliminate the fluctuation in resonance frequency. The modulated output of the oscillator-modulator which is derived from the first output terminal 67 may then be radiated by means of an antenna; while the local oscillator output is taken at the second output terminal 69.

Figure 5:
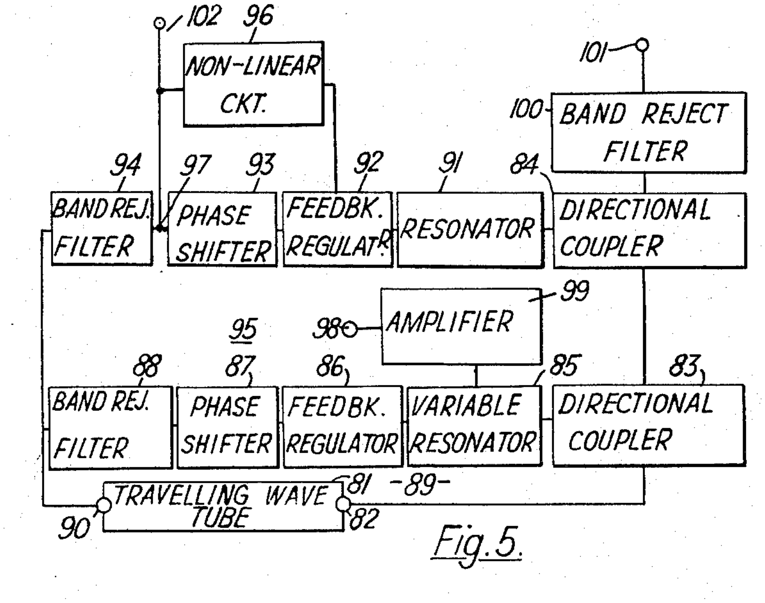
FIG. 5 is an alternative embodiment of the invention showing a modified disposition of the modulation.

The oscillator-modulator such as is obtained by modifying the oscillator of FIG. 4 in the manner explained, is also attainable with the construction shown in FIG. 5. In the oscillator-modulator illustrated therein, the output power of the travelling-wave tube 81 is, in the manner explained in connection with the microwave two-frequency oscillator of FIG. 4, fed back from the output terminal 82 thereof: on one hand, through a directional coupler 83, a variable resonance frequency resonator 85, a feedback regulating circuit 86, a phase shifter 87, and a band-rejection filter 88 to an input terminal 90: and on the other hand, through a second directional coupler 84, a cavity resonator 91, a second feedback regulating circuit 92, a second phase shifter 93, and a second band-rejection filter 94 to the input terminal 90. In order to make the second feedback circuit 95 a non-linear feedback circuit, a non-linear circuit 96 which is similar to the aforementioned non-linear circuit 70 is connected to the feedback regulator 92. The signal representing the information to be transmitted, or the modulating signal, is applied to an input terminal 98 and fed through an amplifier circuit 99 to the first cavity resonator 85 whose resonance frequency is controllable, so as to modulate the oscillation whose frequency is determined by the first feedback circuit 89. A cavity resonator may be employed in the variable frequency resonator 85 and a semiconductor diode coupled thereto in the known manner so that the impedance of the diode may be varied in accordance with modulating signal applied thereto and the resonance frequency of the resonator may thereby be varied. By selecting the Q's of the cavity resonators 85 and 91 in the manner above-explained, it is possible to stabilize the oscillation frequency of the local oscillator portion comprising the second feedback circuit 95. Thus whatever may be the output level of the modulator portion (comprising the first feedback circuit 89) the local oscillation output is extremely stable since the second feedback circuit 95 comprises a non-linear circuit. The output thus frequency-modulated can be taken out at terminal 101 via the band-rejection filter 100 connected to the directional coupler 84, and radiated by means of an antenna; while the output of the local oscillator portion can be derived at a second output terminal 102 connected to the output 97 of the second phase shifter 93, as was the case with the oscillator of FIG. 4.

In the above, description has been made merely in regards to a two-frequency oscillator comprising a microwave amplifier and two feedback circuits. It will, however, be understood that the number of the feedback circuits can be increased so as to provide an oscillator for three or more frequencies. It is also to be understood that although the description has been made with respect to travelling wave tubes any UHF amplifier, comprising one or a plurality of microwave tubes, which has a frequency band of the required width may be used. Also, the cavity resonators may be any other type resonators which fulfill the functional requisites described. It is also to be understood that although the description has been limited to frequency modulation, the invention is generally applicable to angle modulation (frequency or phase). Thus, for example, in lieu of a variable resonator, a variable phase shifter may be employed and driven to effect phase modulation.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. A multi-frequency oscillator for the high frequency region comprising:
 (A) an ultra-high-frequency wide band amplifier;
 (B) at least $n$ feedback paths connected in parallel between the output and input of said amplifier, where $n$ is an integral number greater than one, each feedback path including:
  (1) a frequency resonator which is resonant at a predetermined frequency, the resonators in different feedback paths being resonant at different frequencies, and
  (2) a feedback regulator serially connected to said resonator;
 (C) $n-1$ of said feedback paths including a non-linear circuit connected to said feedback regulator for providing said feedback paths with a non-linear feedback characteristic; and (D) means coupled to said oscillator for deriving the frequencies produced therein.

2. A multi-frequency oscillator for the ultra-high-frequency region comprising:
 (A) an ultra-high-frequency wide band amplifier;
 (B) at least $n$ feedback paths connected in parallel between the input and output of said amplifier, where $n$ is an integral number greater than one, each feedback path including:
  (1) a feedback regulator, and
  (2) a resonant circuit serially connected to said feedback regulator, the resonant circuits in different feedback paths being resonant at different frequencies, the resonant circuit in at least one of said feedback paths being variably resonant;
 (C) $n-1$ of said feedback paths including a non-linear circuit connected to said feedback regulator for providing said feedback paths with a non-linear feedback characteristic; and
 (D) means coupled to said oscillator for deriving the frequencies produced therein.

3. A multi-frequency oscillator as claimed in claim 1 in which each of said $n$ feedback paths includes a series phase shifter; and at least one of said feedback paths includes a frequency filter.

4. The multi-frequency oscillator claimed in claim 3 as an oscillator modulator: said multi-frequency oscillator further comprising means connected into one of said feedback paths for angle modulating the frequency produced therein.

5. A multi-frequency oscillator as claimed in claim 1 in which said ultra-high-frequency amplifier is a travelling wave tube; and in which said $n$ feedback paths are connected in parallel by directional couplers.

6. The multi-frequency oscillator in claim 5 as an oscillator-modulator: said multi-frequency oscillator further comprising means for applying the modulating signal to the helical electrode of said travelling wave tube.

7. An oscillator-modulator as claimed in claim 6 in which the Q of each resonator in $n-1$ of said feedback paths is large with respect to the Q of the remaining resonator whereby the modulation is effected at only one frequency.

8. The multi-frequency oscillator claimed in claim 2 as an oscillator modulator: said multi-frequency oscillator further comprising means connected to said variably resonant circuit for varying the frequency thereof in accordance with a modulating signal.

References Cited in the file of this patent

UNITED STATES PATENTS

| | | |
|---|---|---|
| 2,751,518 | Pierce | June 19, 1956 |
| 2,784,377 | Hopper | Mar. 5, 1957 |
| 2,787,673 | Cutler | Apr. 2, 1957 |
| 3,104,359 | Tachizawa et al. | Sept. 17, 1963 |